(12) United States Patent
Cracraft et al.

(10) Patent No.: US 11,596,103 B2
(45) Date of Patent: Mar. 7, 2023

(54) LAWN MOWER BAGGER CONNECTION

(71) Applicant: Ariens Company, Brillion, WI (US)

(72) Inventors: Ricky A. Cracraft, Two Rivers, WI (US); Daniel J. Gindt, Appleton, WI (US); Trenton J. Meyer, Brillion, WI (US); Brent P. Berglund, Brillion, WI (US)

(73) Assignee: Ariens Company, Brillion, WI (US)

( * ) Notice: Subject to any disclaimer, the term of this patent is extended or adjusted under 35 U.S.C. 154(b) by 807 days.

(21) Appl. No.: 16/375,067

(22) Filed: Apr. 4, 2019

(65) Prior Publication Data

US 2019/0223380 A1 Jul. 25, 2019

Related U.S. Application Data

(62) Division of application No. 15/349,701, filed on Nov. 11, 2016, now Pat. No. 10,292,328.

(60) Provisional application No. 62/253,758, filed on Nov. 11, 2015.

(51) Int. Cl.
*A01D 43/063* (2006.01)
(52) U.S. Cl.
CPC ....... *A01D 43/063* (2013.01); *A01D 43/0631* (2013.01)
(58) Field of Classification Search
CPC .. A01D 43/063; A01D 43/0631; A01D 43/06; A01D 34/64
See application file for complete search history.

(56) References Cited

U.S. PATENT DOCUMENTS

| | | | |
|---|---|---|---|
| 3,597,786 A * | 8/1971 | Ruhl | A01G 20/43 15/83 |
| 3,974,631 A | 8/1976 | Rhodes | |
| 4,238,918 A | 12/1980 | Saruhashi et al. | |
| 4,306,408 A | 12/1981 | Christopherson et al. | |
| 4,393,645 A | 7/1983 | Moore | |
| 4,432,192 A * | 2/1984 | Maier | A01D 34/661 56/10.4 |
| 4,522,019 A * | 6/1985 | Edwards | A01D 43/0636 56/16.6 |
| 4,532,755 A | 8/1985 | Schemelin et al. | |
| 4,569,187 A * | 2/1986 | Spiker | A01D 43/07 56/16.6 |

(Continued)

*Primary Examiner* — Thomas B Will
*Assistant Examiner* — Joan D Misa
(74) *Attorney, Agent, or Firm* — Michael Best & Friedrich LLP (57) ABSTRACT

A lawn mower includes a mower frame with a first connection point and a second connection point spaced apart from the first connection point. The lawn mower also includes a prime mover supported by the mower frame forward of the first and second connection points, a mower deck mounted to the mower frame, a cutting blade mounted below the mower deck, and an accessory releasably coupled to the mower frame. The accessory includes a first linkage member that extends from the accessory toward the first connection point, and a second linkage member that extends from the accessory toward the second connection point. A hook is coupled to an end of the first linkage member and engages the first connection point. A latch is coupled to an end of the second linkage member and is operable to engage the second connection point to selectively secure the accessory to the mower frame.

12 Claims, 10 Drawing Sheets

(56) References Cited

U.S. PATENT DOCUMENTS

| | | |
|---|---|---|
| 4,589,251 A | 5/1986 | Amano et al. |
| 4,735,037 A | 4/1988 | Benter |
| 4,738,088 A | 4/1988 | Klever et al. |
| 4,787,197 A | 11/1988 | Schweigert |
| 4,800,712 A | 1/1989 | Morse et al. |
| 4,903,469 A | 2/1990 | Murakawa et al. |
| 5,018,346 A | 5/1991 | Ishimaru et al. |
| 5,419,673 A | 5/1995 | Merhar |
| 5,685,689 A | 11/1997 | Schneider et al. |
| 6,073,512 A | 6/2000 | McCormick et al. |
| 6,089,006 A | 7/2000 | Langford et al. |
| 6,226,970 B1 | 5/2001 | Busboom et al. |
| 6,272,818 B1 * | 8/2001 | Sebben ............. A01D 43/0631 56/10.2 R |
| 6,557,333 B2 | 5/2003 | Swart et al. |
| 6,595,737 B1 | 7/2003 | Parish |
| 7,607,284 B2 | 10/2009 | Kanai et al. |
| 7,617,663 B1 | 11/2009 | Walton et al. |
| 7,908,837 B2 | 3/2011 | Wolff |
| 7,992,373 B2 | 8/2011 | Ogata et al. |
| 9,107,343 B1 | 8/2015 | Gaeddert et al. |
| 9,801,341 B2 | 10/2017 | Canonge |
| 9,943,033 B1 * | 4/2018 | Gaeddert ............. A01D 43/063 |
| 10,292,328 B2 * | 5/2019 | Cracraft ............. A01D 43/063 |
| 2006/0272309 A1 | 12/2006 | Moore |
| 2009/0182470 A1 | 7/2009 | Garvey et al. |
| 2015/0233085 A1 | 8/2015 | Seljestad |
| 2015/0237800 A1 | 8/2015 | DeHart |

* cited by examiner

LAWN MOWER BAGGER CONNECTION

CROSS-REFERENCE TO RELATED APPLICATIONS

This application is a divisional of co-pending U.S. patent application Ser. No. 15/349,701, filed on Nov. 11, 2016, which claims priority to prior-filed U.S. Provisional Patent Application No. 62/253,758, filed Nov. 11, 2015, the entire contents of which are incorporated by reference.

BACKGROUND

The present invention relates to a bagger assembly for use on a lawn mower.

SUMMARY

In one embodiment, the invention provides a lawn mower including a mower frame, a prime mover supported by the mower frame, a mower deck mounted to the mower frame, a cutting blade mounted below the mower deck to cut vegetation under the mower deck, and a bagger assembly releasably coupled to the mower frame. The bagger assembly includes a receptacle for collecting cut vegetation. The receptacle has a lid. The bagger assembly also includes a latch supported by the receptacle and operable to engage the mower frame. The latch is moveable between a first position, in which the latch is secured to the mower frame, and a second position, in which the latch is released from the mower frame. The bagger assembly further includes a cord positioned on the lid and coupled to the latch. The cord is operable to move the latch from the first position to the second position.

In another embodiment, the invention provides a lawn mower including a mower frame having a first connection point and a second connection point spaced apart from the first connection point, a prime mover supported by the mower frame forward of the first and second connection points, a mower deck mounted to the mower frame, and a cutting blade mounted below the mower deck to cut vegetation under the mower deck. The lawn mower further includes an accessory releasably coupled to the mower frame. The accessory includes a first linkage member extending from the accessory toward the first connection point, a second linkage member extending from the accessory toward the second connection point, and a hook coupled to an end of the first linkage member. The hook engages the first connection point. The accessory further includes a latch coupled to an end of the second linkage member. The latch is operable to engage the second connection point to selectively secure the accessory to the mower frame.

In another embodiment, the invention provides a bagger assembly for use with a lawn mower. The lawn mower includes a mower frame having a first connection point and a second connection point spaced apart from the first connection point. The bagger assembly includes a receptacle for collecting cut vegetation and a bagger frame coupled to the receptacle. The bagger frame includes a lower linkage member and an upper linkage member. The bagger assembly also includes a hook coupled to an end of the lower linkage member. The hook is configured to engage the first connection point of the lawn mower. The bagger assembly further includes a latch coupled to an end of the upper linkage member. The latch is moveable between a first position, in which the latch is configured to be secured to the second connection point of the lawn mower, and a second position, in which the latch is released from the second connection point of the lawn mower. The bagger assembly also includes a cord coupled to the latch. The cord is operable to move the latch from the first position to the second position.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
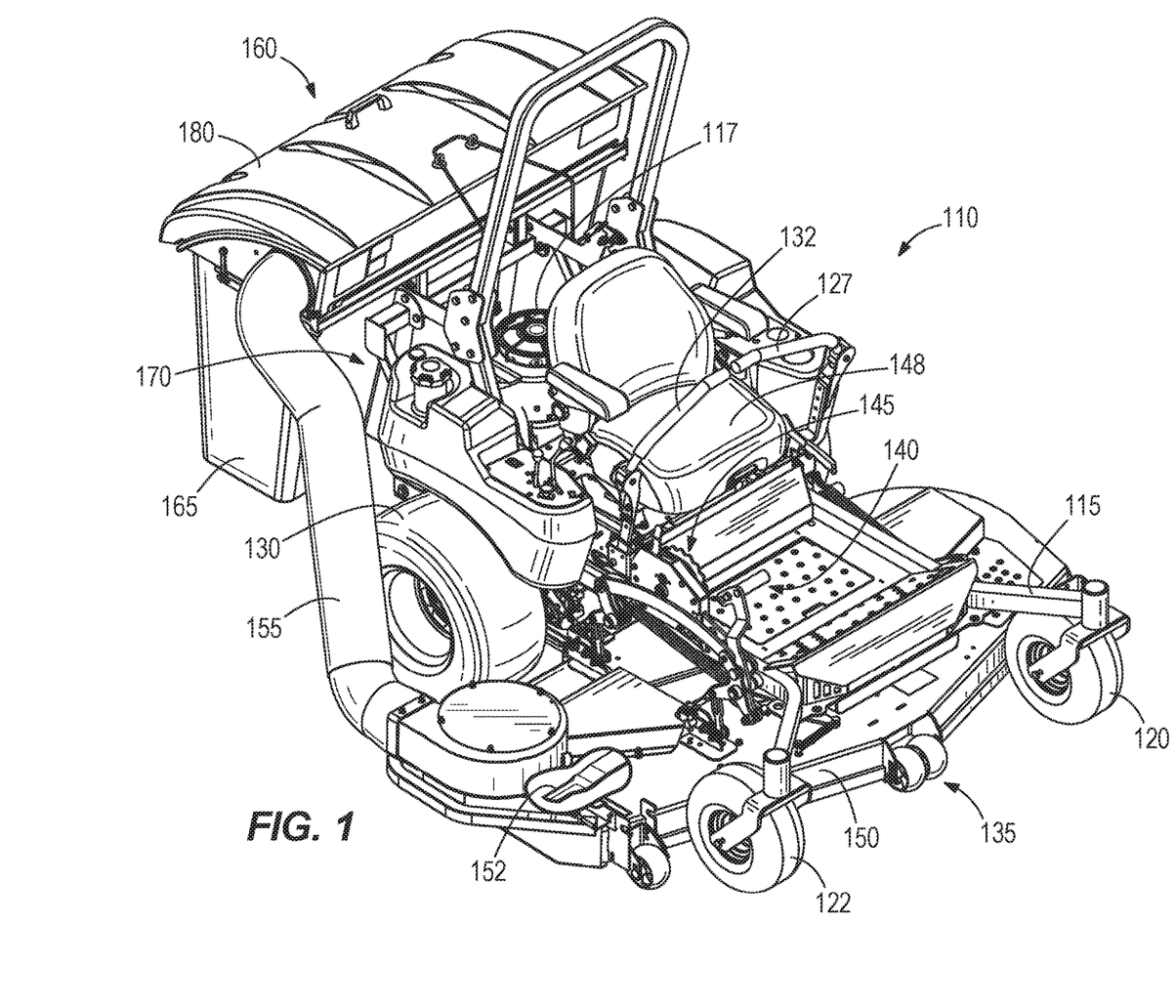
FIG. 1 is a perspective view of a lawn mower including a bagger assembly according to one embodiment of the present invention.
Figure 2:
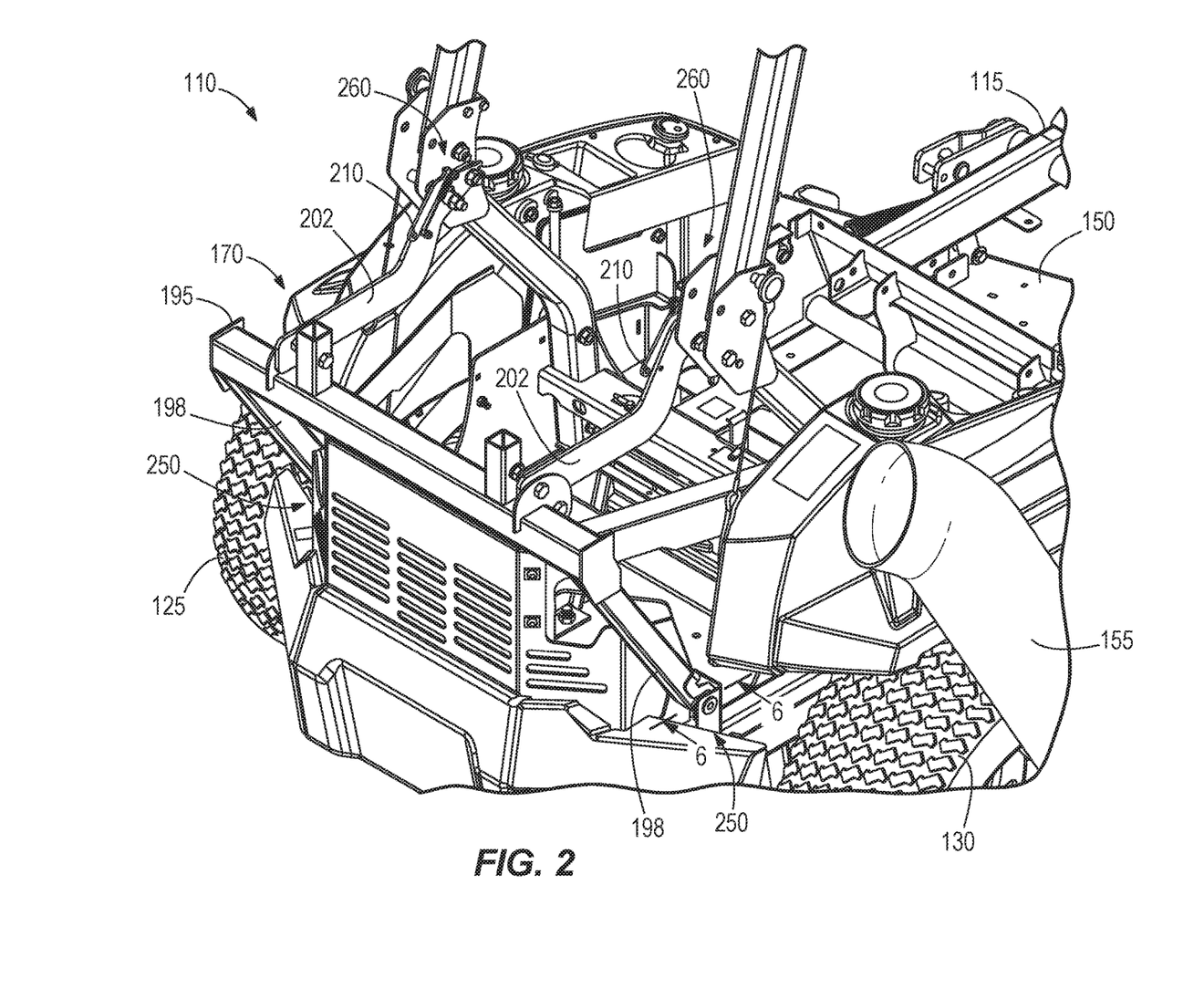
FIG. 2 is a rear perspective view of a portion of the lawn mower, including a frame to which a receptacle of the bagger assembly attaches.

FIGS. 1 and 2 illustrate a lawn mower 110 including a frame 115, a prime mover 117, left and right driven wheels 125, 130, left and right passive wheels 120, 122, a deck assembly 135, a deck lifting assembly 140, and a height-of-cut assembly 145. The terms "front," "rear," "left," and "right" will be used in this specification from the perspective of an operator seated on the lawn mower 110 during ordinary operation. The frame 115 is supported by the driven wheels 125, 130 and passive wheels 120, 122, and in turn supports the other components of the lawn mower 110. The prime mover 117 may be, for example, a gasoline powered internal combustion engine, but may also be any other type of prime mover such as an electric motor, a hybrid gas/electric motor, a fuel cell, or any other suitable device operating on a suitable fuel.

In some embodiments, the left and right driven wheels 125, 130 are interconnected with the prime mover 117 through a power transmission and suitable hydraulic pumps and motors. The hydraulic pumps and motors are manipulated with a pair of control arms 127, 132 with one of the control arms 127 controlling the direction and speed of rotation of the left driven wheel 125 and the other control arm 132 controlling the direction and speed of rotation of the right driven wheel 130.

The illustrated lawn mower 110 may be referred to as a zero-turn-radius lawn mower or ZTR lawn mower because when one of the control arms (e.g., control arm 127) is pressed forward and the other control arm (e.g., control arm 132) is pulled rearward, the lawn mower 110 will move in a very tight radius owing to one wheel (e.g., left wheel 125) rotating forward and the other wheel (e.g., right wheel 125) rotating backwards. A ZTR lawn mower steers through the speed and direction difference of the two driven wheels 125, 130. Further, the illustrated lawn mower 110 is a sitting lawn mower, in which the operator sits in a seat 148 during operation. The deck lifting assembly 140 discussed below is applicable to this type of lawn mower and also to any other type of lawn mower or yard machine. Examples of other types of lawn mowers include large walk-behind units, standing mowers (in which the operator stands during operation), and tractors (in which a steering wheel is used instead of control arms, and the mower is not designed to execute zero-radius turns).

The deck assembly 135 includes a deck 150 and multiple cutting blades 152 (although only one cutting blade is shown). The prime mover 117 drives rotation of the cutting blades 152 to cut vegetation (e.g., grass) under the deck 150. In the illustrated embodiment, the cut vegetation and other debris is directed toward and through a debris hose 155 in order to be collected. In other embodiments, the cut vegetation and other debris is mulched in the deck 150 via the cutting blades 152 and expelled onto the ground surface.

Figure 3:
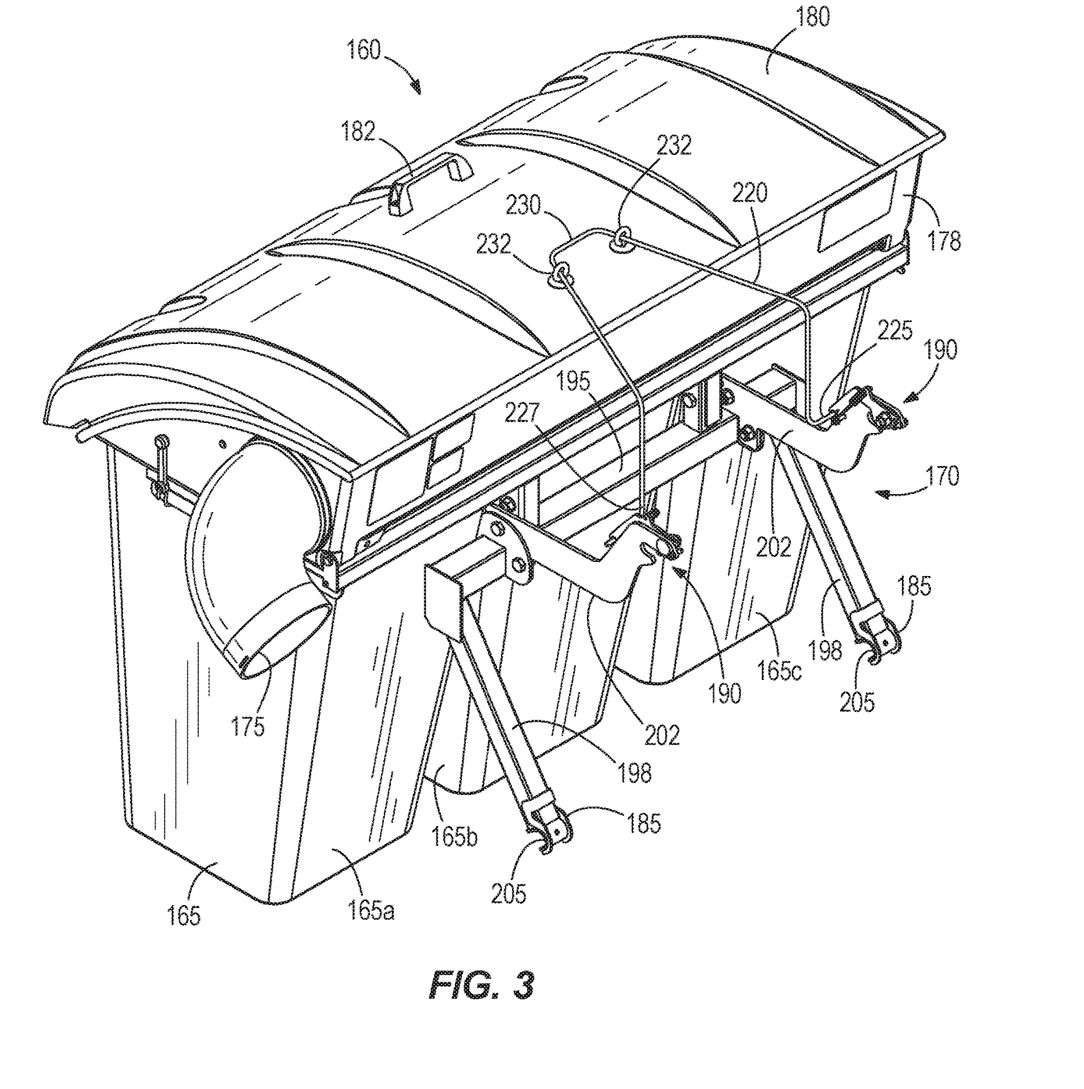
FIG. 3 is a perspective view of the bagger assembly.

With reference to FIGS. 1-3, the illustrated lawn mower 110 further includes a bagger assembly 160 selectively mounted to the rear of the lawn mower 110. The bagger assembly 160 includes a receptacle 165 for storing the cut vegetation and other debris, and a quick connection assembly 170 for attaching the bagger assembly 160 to the frame 115 of the lawn mower 110. The illustrated receptacle 165 includes three mesh bags 165a-c (FIG. 3) for receiving clippings from the lawn mower 110. In other embodiment, the receptacle 165 may include fewer or more bags, or may include one or more plastic bodies that receive clippings from the lawn mower 110. The receptacle 165 also includes an inlet 175 that interfaces with the debris hose 155. The inlet 175 facilitates directing the cut vegetation and other debris toward the interior of the receptacle 165 and into the mesh bags 165a-c. The receptacle 165 further includes a hood 178 positioned over the bags 165a-c. The hood 178 has a lid 180 that is pivotable between a closed position, in which access to the interior of the receptacle 165 is inhibited, and an open position, in which access to the interior of the receptacle 165 is allowed. To move the lid 180 between the open position and the closed position, an operator grasps and manipulates a handle 182 extending from the lid 180. When the receptacle 165 is full, an operator may, for example, move the lid 180 to an open position to empty the contents of the receptacle 165 (e.g., by removing the mesh bags 165a-c).

Figure 4:
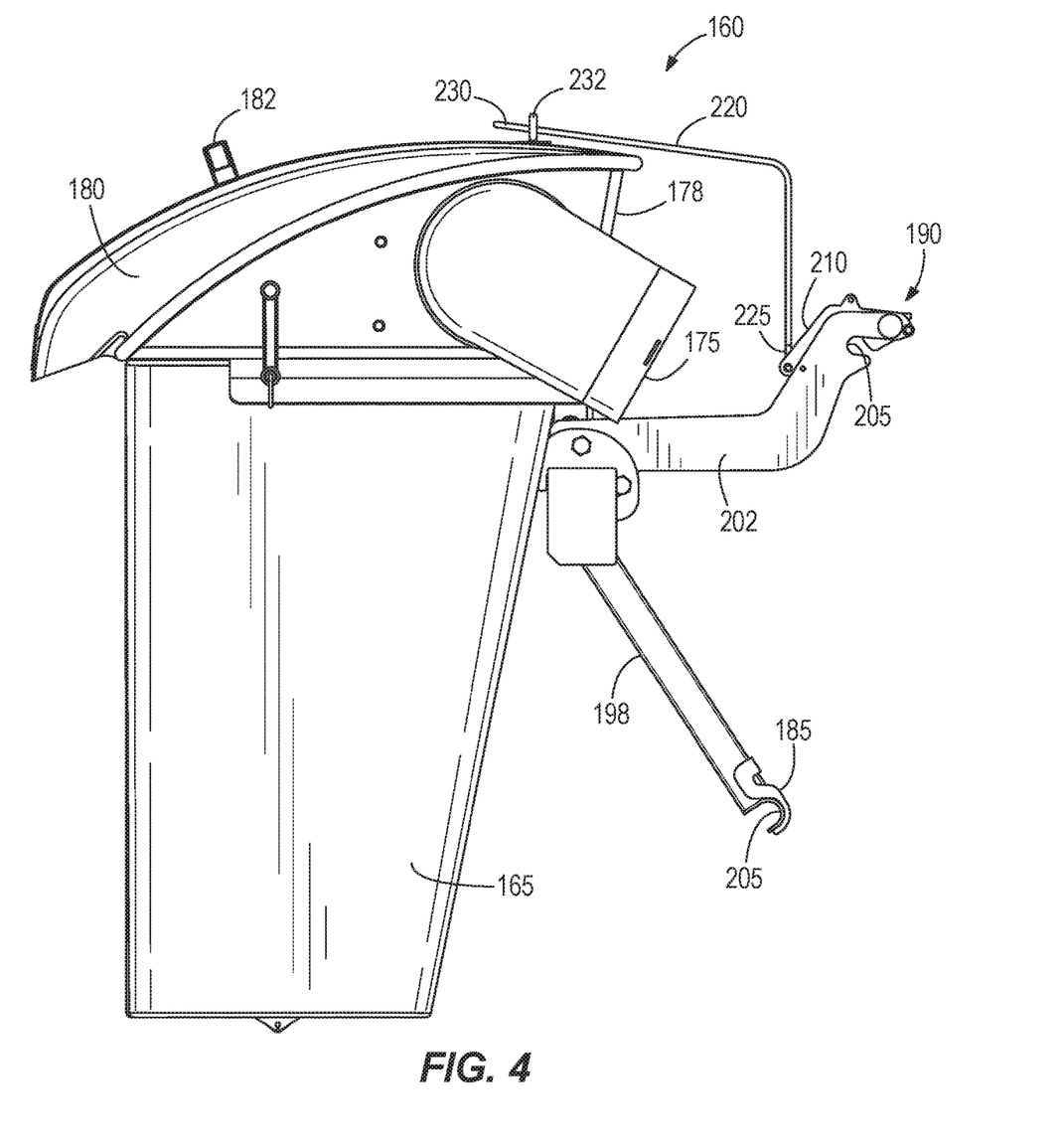
FIG. 4 is a side view of the bagger assembly.

With reference to FIGS. 3 and 4, the quick connection assembly 170 includes a pair of hooks 185, a pair of latches 190, and a bagger frame 195 to support the receptacle 165, the hooks, and latches 185, 190. The bagger frame 195 includes two lower linkage members 198 and two upper linkage members 202. The hooks 185 are coupled to ends of the lower linkage members 198. The latches 190 are coupled to ends of the upper linkage members 202. In the illustrated embodiment, the quick connection assembly 170 includes the two hooks 185 and the two latches 190, although in other embodiments, the assembly 170 may include fewer or more hooks 185 and/or latches 190. The lower linkage members 198 supporting the hooks 185 extend in a first direction (e.g., generally forwardly and downwardly as viewed in FIG. 4) from the receptacle 165. The upper linkage members 202 supporting the latches 190 extend in a second direction (e.g., generally forwardly and upwardly as viewed in FIG. 4) from the receptacle 165. As such, the hooks 185 and the latches 190 interface with different locations of the frame 115. For example, the lower linkage members 198 drive the primary load path of the bagger assembly 160 directly to the frame 115 of the lawn mower 110. Each hook 185 and each latch 190 defines a receiving channel 205 for receiving at least a portion of the frame 115. Although the illustrated hooks 185 are C-shaped members, in other embodiments, the hooks 185 may include catches, holders, retainers, locks, or other interface members.

Figure 7:
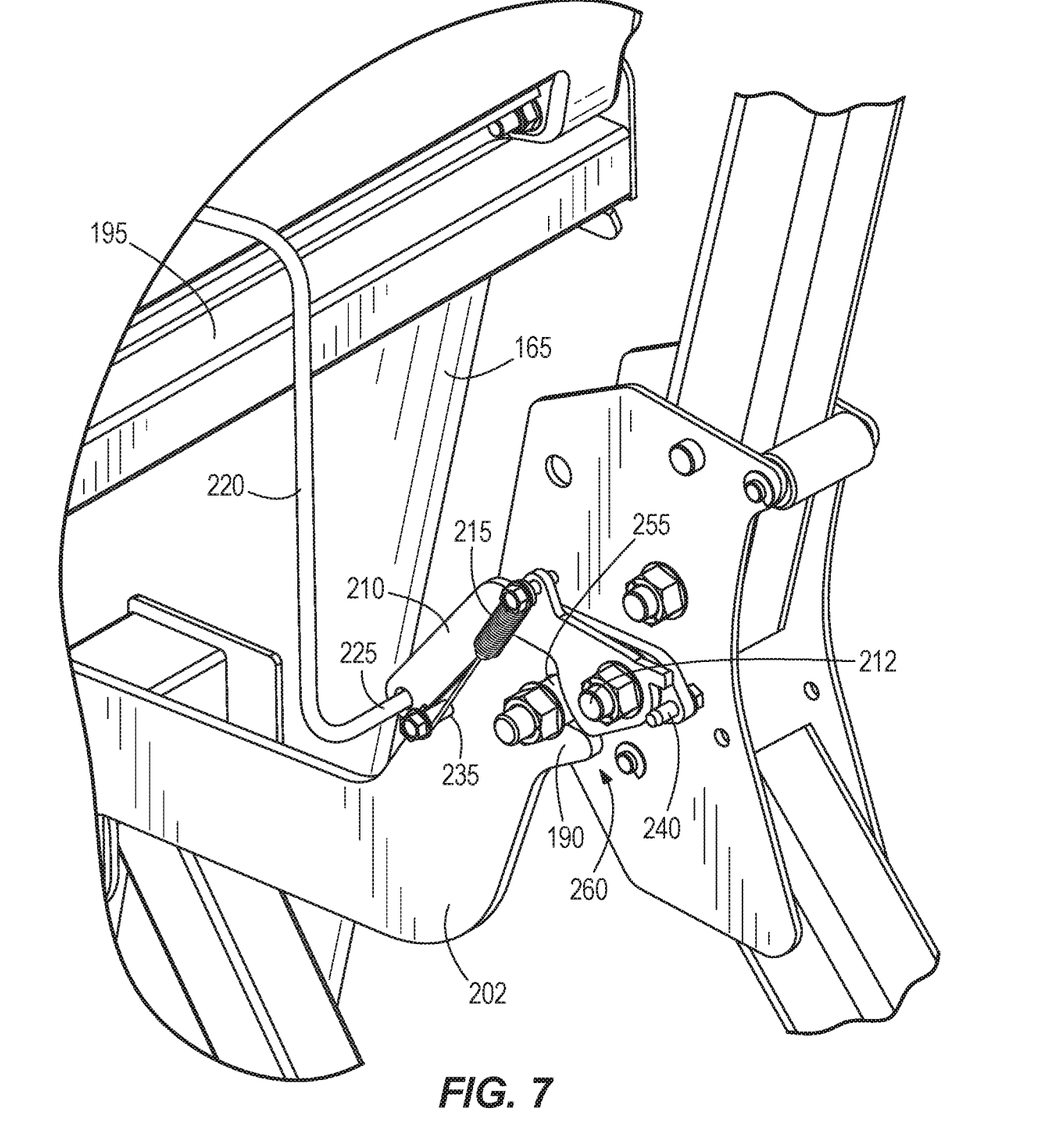
FIG. 7 is an enlarged perspective view of a portion of the bagger assembly, illustrating an upper latch in a closed position and connected to the frame of the lawn mower.
Figure 8:
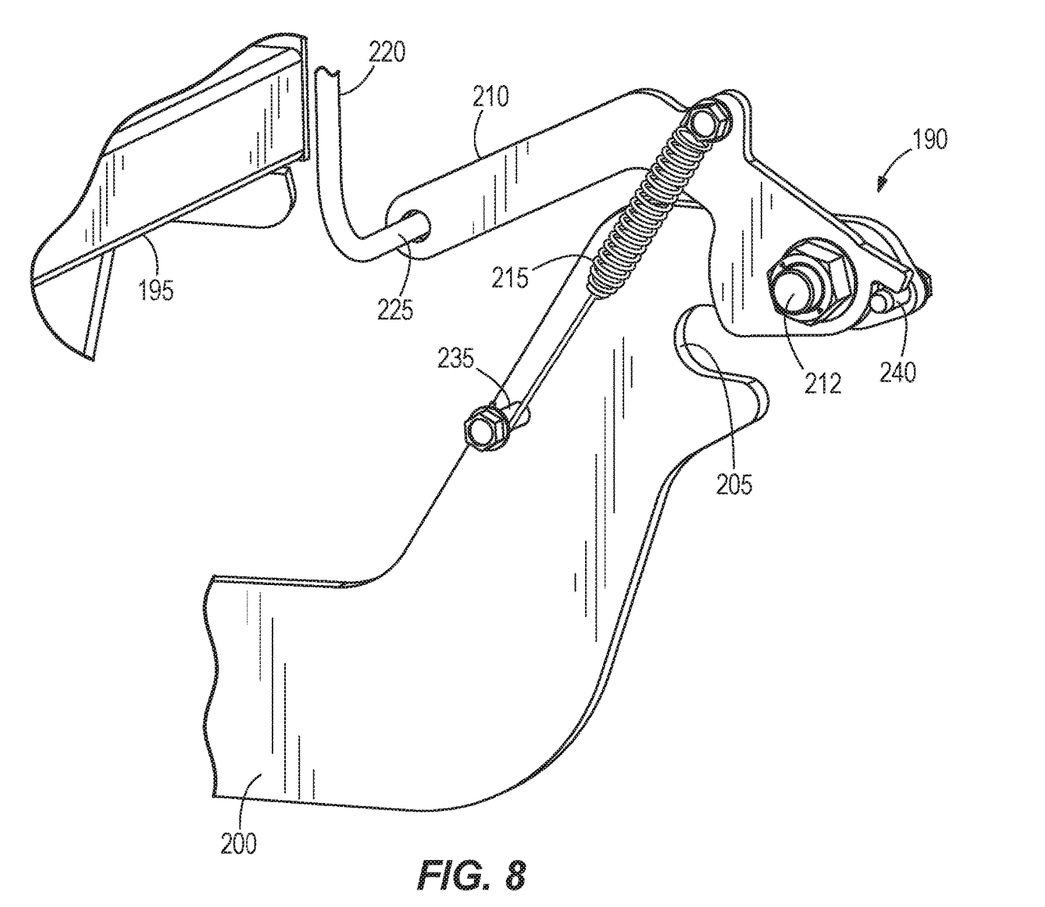
FIG. 8 is a perspective view of the upper latch of the bagger assembly in an open position.

As shown in FIGS. 7 and 8, each latch 190 includes a lever 210 pivotably coupled to a corresponding linkage member 202 by a fastener 212 (e.g., a bolt). The fastener 212 defines a pivot axis of the corresponding lever 210. Each lever 210 is pivotable between a first or locked position (FIG. 7) and a second or unlocked position (FIG. 8). Each lever is also biased to the locked position by a biasing element 215, such as a spring. The illustrated biasing element 215 is a coil spring, although other biasing elements may also or alternatively be used. The levers 210 are pivotable against the force of the biasing elements 215 to move the latches 190 to the unlocked positions. Specifically, the levers 210 are user-manipulable between the locked position and the unlocked position. However, each latch 190 may couple to the frame 115 at a location that is difficult to access by an operator. Therefore, the bagger assembly 160 also includes a cord 220 to move each lever 210 toward the unlocked position.

As shown in FIG. 3, the illustrated cord 220 is coupled to both levers 210 to move both latches 190 to the unlocked position simultaneously. The cord 220 may be, for example, a rope, cable, wire, chain or other flexible elongated element. The cord 220 has a first end 225 secured to one of the levers 210, a second end 227 secured to the other lever 210, and a mid-section 230 accessible to an operator at a location spaced apart from the levers 210. In the illustrated embodiment, the cord 220 extends over the lid 180 so the mid-section 230 is accessible above the receptacle 165. The cord 220 is threaded through guide members 232 extending from a top surface of the lip 180 to maintain the position of the cord 220 above the receptacle 165. In the illustrated embodiment, the guide members 232 are eyebolts. In other embodiments, the guide members 232 may alternatively be apertures, retainers, loops, rings, or other similar retention means disposed on the lid 180. The eyebolts 232 guide movement of the cord 220 when an operator actuates (e.g., pulls) the cord 220. The eyebolts 232 also inhibit the cord 220 from interfering with the handle 182 when the lid 180 moves (e.g., is opened and closed). Although this particular embodiment illustrates the actuator for the latches 190 as the flexible elongated cord 220, in other embodiments, the actuator may alternatively be a bar, linkage, or lever. Additionally or alternatively, the actuator may be comprised of multiple cords or other suitable actuators.

Referring back to FIGS. 7 and 8, a first stop 235 and a second stop 240 are coupled to each upper linkage member 202. The stops 235, 240 are engageable with the lever 210 to limit the lever 210 from pivoting beyond the locked position and the unlocked position, respectively. The illustrated stops 235, 240 are bolts that are coupled to the upper linkage members 202, although other types of stops may alternatively be coupled to or formed on the upper linkage members 202. In the illustrated embodiment, each biasing element 215 extends between the corresponding first stop 235 and lever 210 to pull the lever 210 toward the locked position.

As shown in FIG. 2, the frame 115 of the lawn mower 110 includes a first set of connection points 250 and a second set of connection points 260. The connection points 250, 260 are located on a rear of the frame 115, behind the prime mover 117 and other components of the lawn mower 110. The connection points 250, 260 are areas on the frame 115 to which the bagger assembly 160 attaches. The connection points 250, 260 are spaced apart from each other to help reduce the load on any specific part of the frame 115. In the illustrated embodiment, the second connection points 260 are positioned above the first connection points 250. The first connection points 250 include lower pins 245, and the second connection points 260 include upper pins 255.

Figure 5:
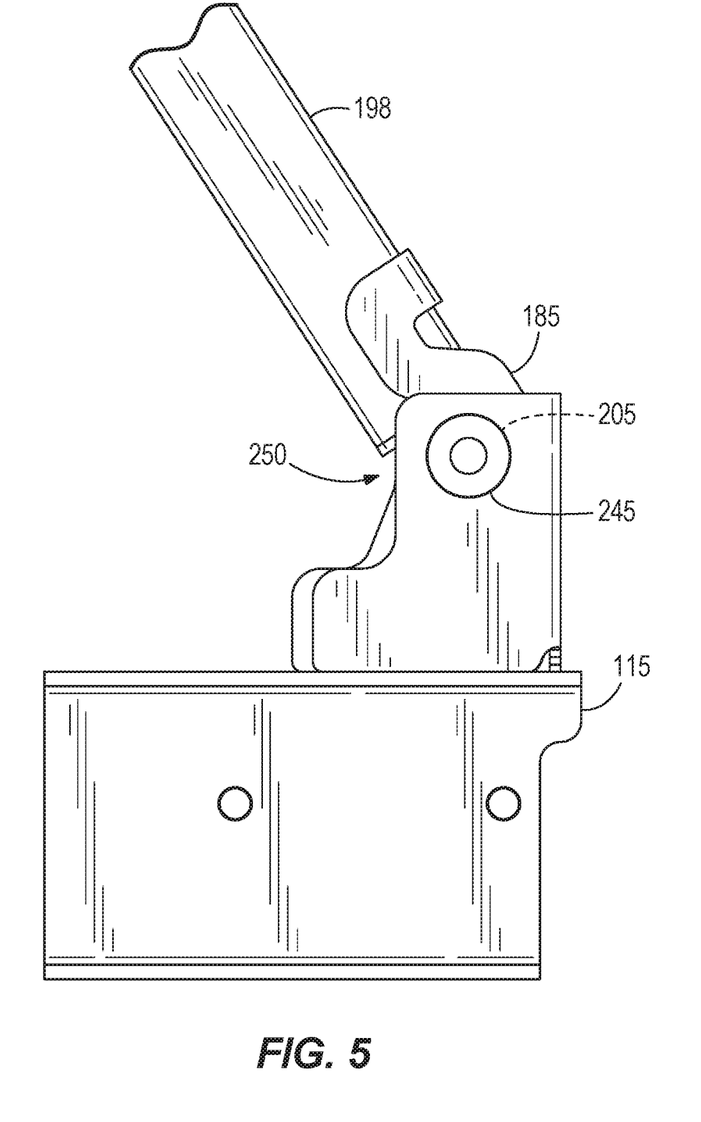
FIG. 5 is an enlarged side view of a portion of the bagger assembly, illustrating a lower hook connected to the frame of the lawn mower.
Figure 6:
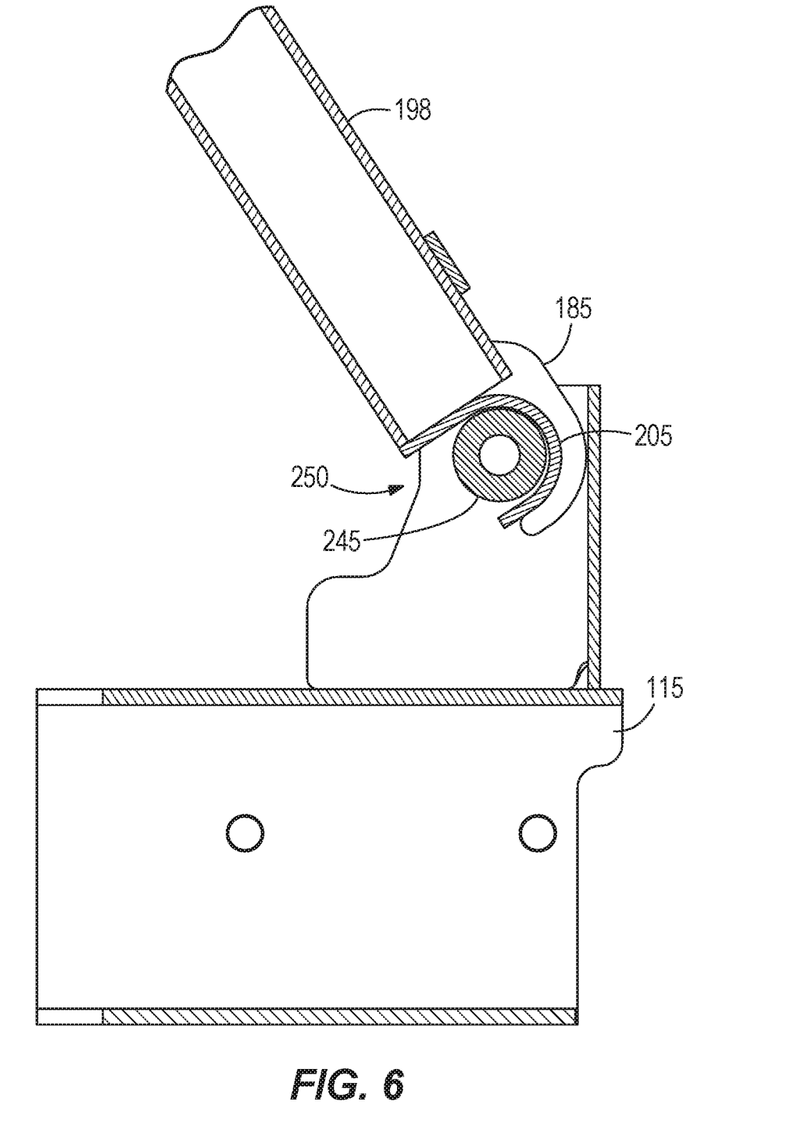
FIG. 6 is a cross-sectional view of the lower hook connected to the frame taken along section line 6-6 of FIG. 2.

With reference to FIGS. 5 and 6, the hooks 185 are engageable with the corresponding lower pins 245 on the frame 115 of the lawn mower 110. In the illustrated embodiment, the receiving channel 205 of each hook 185 interfaces with the corresponding lower pins 245 to couple the bagger assembly 160 to the first connection points 250 on the frame 115. In other embodiments, the hooks 185 may be other types of connecting members that releasably engage the lower pins 245 of the frame 115. The hooks 185 become self-locked to the lower pins 245 through rotation around the lower pins 245. Specifically, the bagger assembly 160 is inhibited from uncoupling from the lawn mower 110 in an upward direction as the hooks 185 are engaged with the lower pins 245 and the frame 115, as shown in FIG. 6.

With reference to FIG. 7, the latches 190 are engageable with the corresponding upper pins 255 on the frame 115 of the lawn mower 110. In the illustrated embodiment, the receiving channel 205 of each latch 190 interfaces with the corresponding upper pins 255 to couple the bagger assembly 160 to the second connection points 260 on the frame 115. In other embodiments, the latches 190 may be other types of actuatable connecting members that releasably engage the upper pins 255 of the frame 115. In some embodiments, the latches 190 may engage the lower pins 245 of the frame 115, and the hooks 185 may engage the upper pins 255 of the frame 115.

Figure 9:
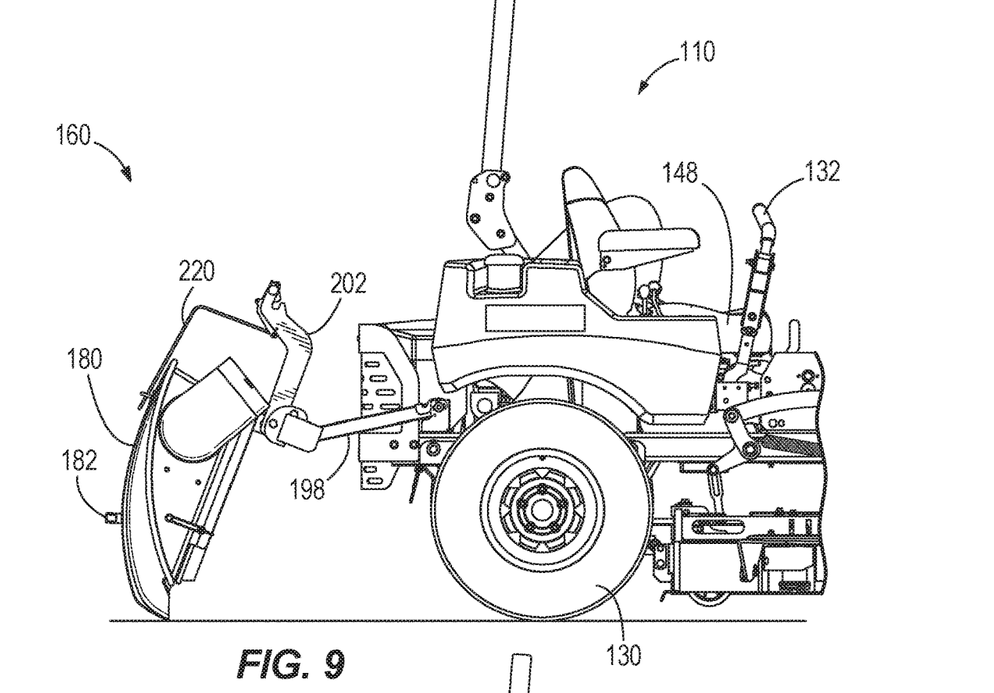
FIGS. 9-11 are side views of the lawn mower, illustrating the bagger assembly being installed onto the lawn mower.
Figure 10:
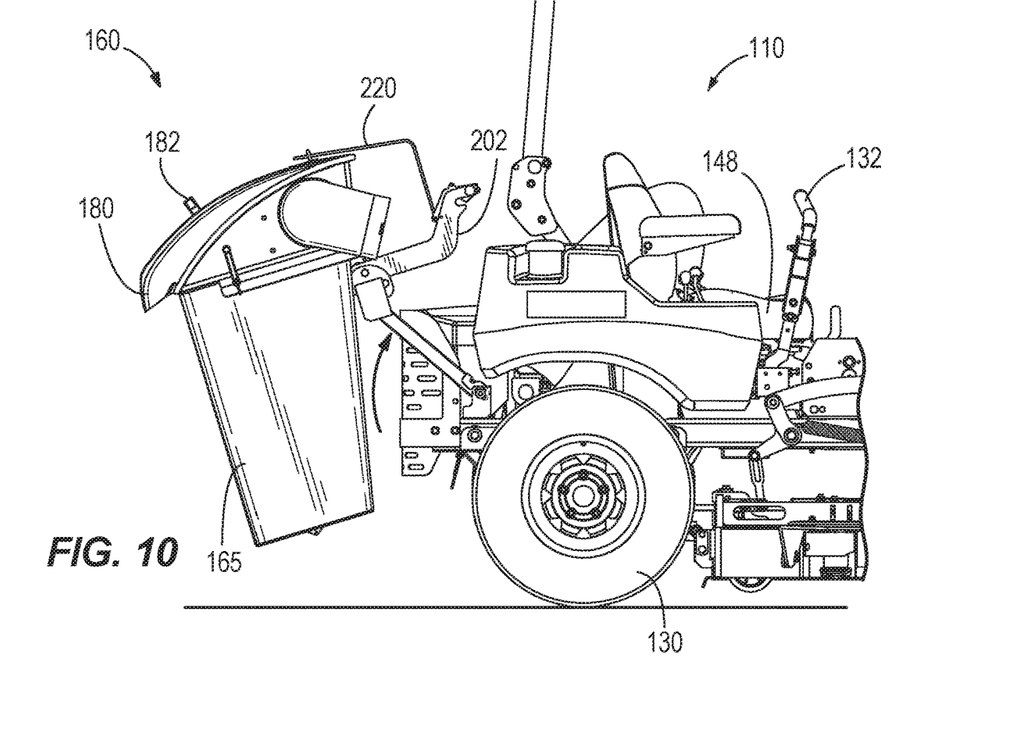
Figure 11:
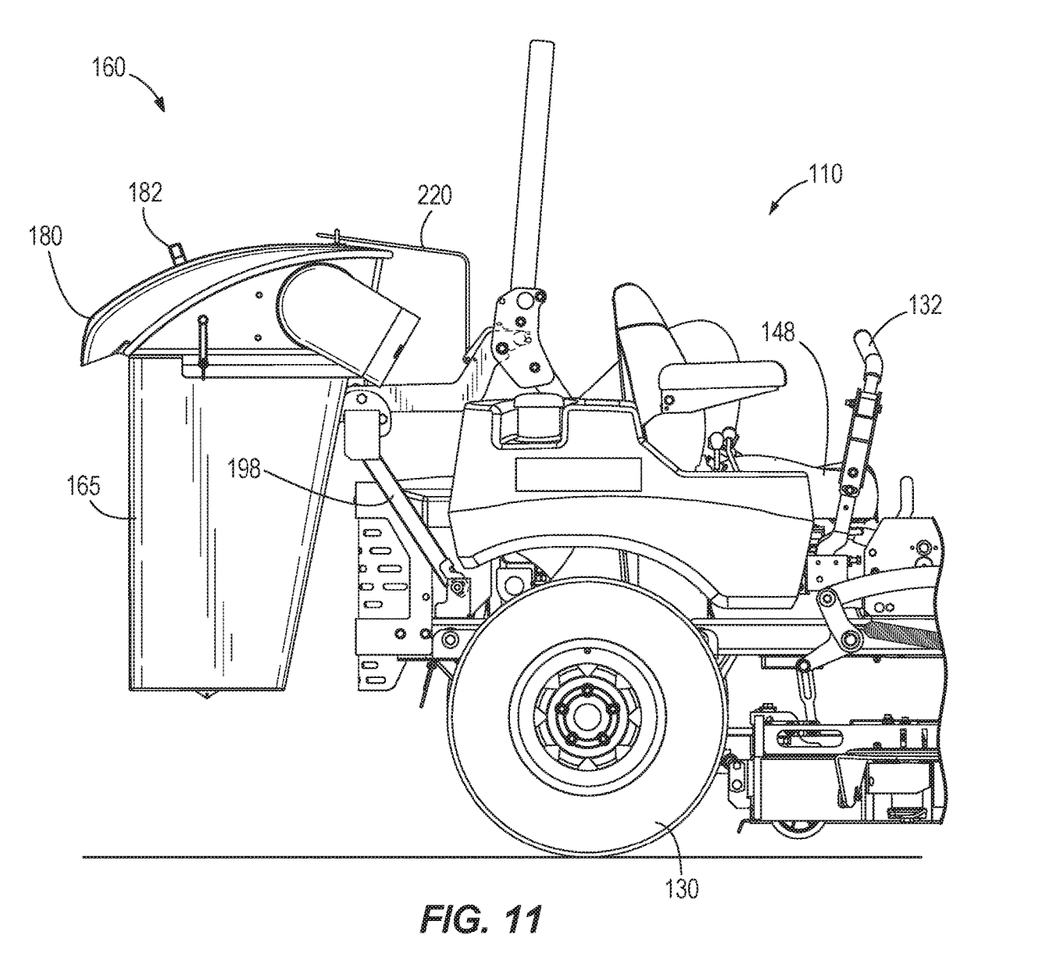

In operation, the bagger assembly 160 is installed onto and removed from the lawn mower 110 by a single operator without any tools, as shown in FIGS. 9-11. To install, for example, the operator engages the hooks 185 of the bagger assembly 160 with the corresponding lower pins 245 (FIG. 9) of the frame 115. While the hooks 185 are being aligned with the lower pins 245, the hood 178 can rest on the ground such that the operator does not need to support the weight of the bagger assembly 160. Once properly aligned, the hood 178 of the bagger assembly 160, which is supported by a ground surface, can be lifted and subsequently pivoted upward about the lower pins 245 (FIG. 10). As the receptacle 165 is lifted a sufficient height, the latches 190 engage the corresponding upper pins 255 (FIG. 11) which, in turn, cause the levers 210 to automatically pivot to the unlocked position. More specifically, when the upper pins 255 are sliding into the respective receiving channels 205 of the latches 190, the upper pins 255 engage portions of the levers 210 to pivot the levers 210 toward the unlocked position. Once the upper pins 255 abut the receiving channels 205, the levers 210 are urged back toward the locked position via the biasing elements 215, thereby fully securing the bagger assembly 160 to the lawn mower 110.

When an operator desires to remove the bagger assembly 160 from the lawn mower 110, the operator grasps the mid-section 230 of the cord 220 and actuates (e.g., pulls) the cord 220. As a result, the lever 210 of each latch 190 pivots against the force of each biasing element 215 to the unlocked position, at which point each latch 190 is removable from the corresponding upper pin 255. Subsequently, the bagger assembly 160 is lowered to the ground surface (FIG. 9) as each hook 185 pivots about the corresponding lower pins 245. Lastly, each hook 185 is disengaged from the lower pins 245 by lifting the bagger assembly 160, thereby fully removing the bagger assembly 160 from the lawn mower 110.

This arrangement allows the operator to connect the bagger assembly 160 to and release the bagger assembly 160 from behind the lawn mower 110. In addition, this arrangement allows a single person to easily connect the bagger assembly 160 to or remove the bagger assembly 160 from the lawn mower 110 using a single release point (e.g., the cord 220). After the bagger assembly 160 is removed from the lawn mower 110, no excess mechanisms are left behind on the lawn mower 110, such as the latches 190 or an actuator (e.g., the cord 220).

Although the invention has been described with reference to a bagger assembly that removably connects to a lawn mower, in other embodiments, other types of lawn mower accessories may alternatively be connected to the lawn mower using the quick connection assembly. For example, in some embodiments, the lawn mower accessory may be a sprayer; a toolbox; a tool rack for supporting peripheral tools (e.g., trimmers, blowers, etc.); a spreader for fertilizer, salt, and/or sand; a large leaf blower; and the like.

Thus, the invention provides, among other things, a bagger assembly or other accessory capable of mounting to a lawn mower without the use of tools. Various features and advantages of the invention are set forth in the following claims.

What is claimed is:

1. A lawn mower comprising:
   a mower frame including a first connection point and a second connection point positioned above the first connection point;
   a prime mover supported by the mower frame forward of the first and second connection points;
   a mower deck mounted to the mower frame;
   a cutting blade mounted below the mower deck to cut vegetation under the mower deck; and
   an accessory releasably coupled to the mower frame, the accessory including
      a first linkage member extending from the accessory toward the first connection point,
      a second linkage member extending from the accessory toward the second connection point,
      a hook coupled to an end of the first linkage member, the hook engaging the first connection point, and
      a latch coupled to an end of the second linkage member, the latch having a lever pivotably coupled to the second linkage member and movable between a locked position and an unlocked position, the latch operable to engage the second connection point to selectively secure the accessory to the mower frame.

2. The lawn mower of claim 1, wherein the accessory further includes a cord coupled to the latch, and wherein the cord is operable to disengage the latch from the second connection point.

3. The lawn mower of claim 2, wherein the cord is accessible to a user from behind the lawn mower, and wherein the cord is moveable away from the mower frame to move the latch from a first position, in which the latch is secured to the mower frame, to a second position, in which the latch is released from the mower frame.

4. The lawn mower of claim 2, wherein the accessory further includes a receptacle for collecting cut vegetation, the receptacle having a lid, wherein at least a portion of the cord is positioned on top of the lid.

5. The lawn mower of claim 1, wherein the first linkage member extends forwardly and downwardly from the accessory, and wherein the second linkage member extends forwardly and upwardly from the accessory.

6. The lawn mower of claim 1, wherein the first linkage member pivots about the first connection point during installation and removal of the accessory from the mower frame.

7. The lawn mower of claim 1, wherein the latch is a first latch, wherein the accessory further includes a second latch coupled to an end of a third linkage member extending from the accessory toward the second connection point, the second latch operable to engage the second connection point to selectively secure the accessory to the mower frame.

8. The lawn mower of claim 7, wherein the first and second latches are simultaneously moved from a first position, in which the first and second latches are secured to the mower frame, and a second position, in which the first and second latches are released from the mower frame.

9. The lawn mower of claim 1, wherein the latch is biased to a first position by a spring, the latch being secured to the mower frame in the first position.

10. The lawn mower of claim 1, wherein the first connection point includes a pin, the hook being self-locked on the pin through rotation of the hook around the pin.

11. A lawn mower comprising:
a mower frame including a first connection point and a second connection point spaced apart from the first connection point;
a prime mover supported by the mower frame forward of the first and second connection points;
a mower deck mounted to the mower frame;
a cutting blade mounted below the mower deck to cut vegetation under the mower deck; and
an accessory releasably coupled to the mower frame, the accessory including
a first linkage member extending from the accessory toward the first connection point,
a second linkage member extending from the accessory toward the second connection point,
a hook coupled to an end of the first linkage member, the hook engaging the first connection point;
a latch coupled to an end of the second linkage member, the latch operable to engage the second connection point to selectively secure the accessory to the mower frame, and
a cord coupled to the latch, and wherein the cord is operable to disengage the latch from the second connection point,
wherein the cord is accessible to a user from behind the lawn mower, and wherein the cord is moveable away from the mower frame to move the latch from a first position, in which the latch is secured to the mower frame, to a second position, in which the latch is released from the mower frame.

12. A lawn mower comprising:
a mower frame including a first connection point and a second connection point spaced apart from the first connection point;
a prime mover supported by the mower frame forward of the first and second connection points;
a mower deck mounted to the mower frame;
a cutting blade mounted below the mower deck to cut vegetation under the mower deck; and
an accessory releasably coupled to the mower frame, the accessory including
a first linkage member extending from the accessory toward the first connection point,
a second linkage member extending from the accessory toward the second connection point,
a hook coupled to an end of the first linkage member, the hook engaging the first connection point;
a latch coupled to an end of the second linkage member, the latch operable to engage the second connection point to selectively secure the accessory to the mower frame,
a cord coupled to the latch, and wherein the cord is operable to disengage the latch from the second connection point, and
a receptacle for collecting cut vegetation, the receptacle having a lid, wherein at least a portion of the cord is positioned on top of the lid.

* * * * *